United States Patent [19]

Tabata et al.

[11] Patent Number: 4,872,650
[45] Date of Patent: Oct. 10, 1989

[54] VIBRATION INSULATING DEVICE

[75] Inventors: Toshiyuki Tabata, Sagamihara; Tatsuro Ishiyama, Yokohama; Takao Ushijima, Chigasaki; Takuya Dan, Yokohama, all of Japan

[73] Assignees: Nissan Motor Co., Ltd., Yokohama; Bridgestone Corporation, Tokyo, both of Japan

[21] Appl. No.: 206,718

[22] Filed: Jun. 15, 1988

[30] Foreign Application Priority Data

Jun. 19, 1987 [JP] Japan .................. 62-152609

[51] Int. Cl.$^4$ .................. F16F 5/00
[52] U.S. Cl. .................. 267/140.1; 123/192 R; 267/219
[58] Field of Search .................. 123/192 R; 248/562; 267/153, 219, 140.1

[56] References Cited

U.S. PATENT DOCUMENTS 4,650,169  3/1987  Eberhard et al. .................. 267/140.1

FOREIGN PATENT DOCUMENTS 0184740  9/1985  Japan .................. 267/140.1
61-65935  4/1986  Japan .
0118131  5/1987  Japan .................. 267/140.1
0118133  5/1987  Japan .................. 267/140.1

Primary Examiner—Duane A. Reger
Attorney, Agent, or Firm—Foley & Lardner, Schwartz, Jeffery, Schwaab, Mack, Blumenthal & Evans

[57] ABSTRACT

A vibration insulating device for preventing vibration from being transmitted from an engine to a vehicle body in an automotive vehicle. The vibration insulating device is comprised of an elastic support member bonded between an inner cylinder connected to the engine and an outer cylinder connected to the vehicle body. The elastic support member is formed with a hollow which is located on an upper side of an imaginary horizontal plane containing the axis of the inner cylinder. The hollow functions to prevent a considerable tensile force from being applied to the elastic support member. Two small liquid chambers are formed between a part of the elastic support member and the inner periphery of the outer cylinder, and located on a lower side of the imaginary vertical plane. The two small liquid chambers communicate through an orifice passage. Additionally, one of the two small liquid chambers is adjacent to an air chamber through a flexible diaphragm.

17 Claims, 11 Drawing Sheets

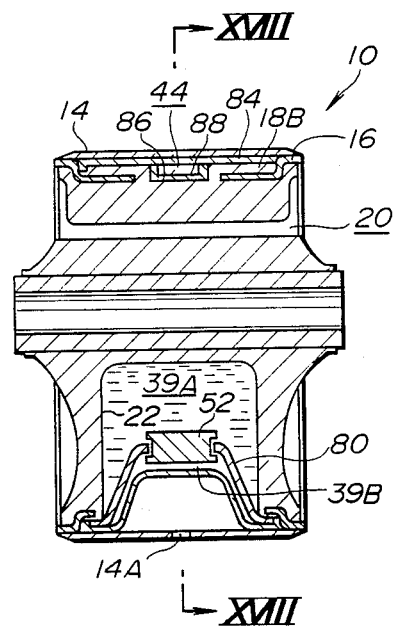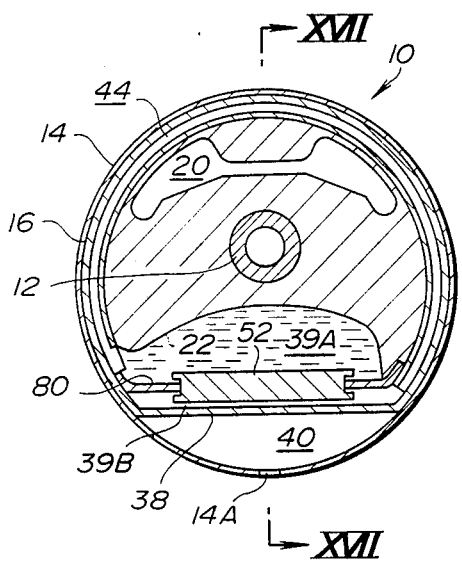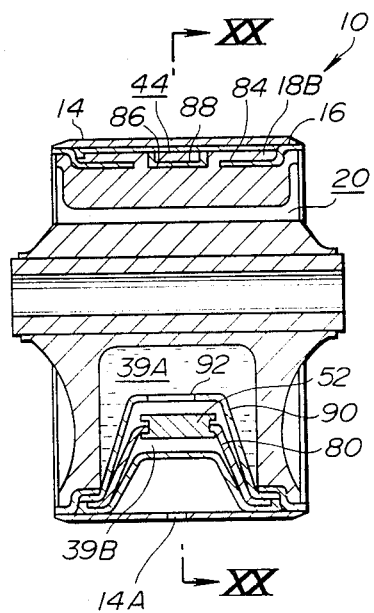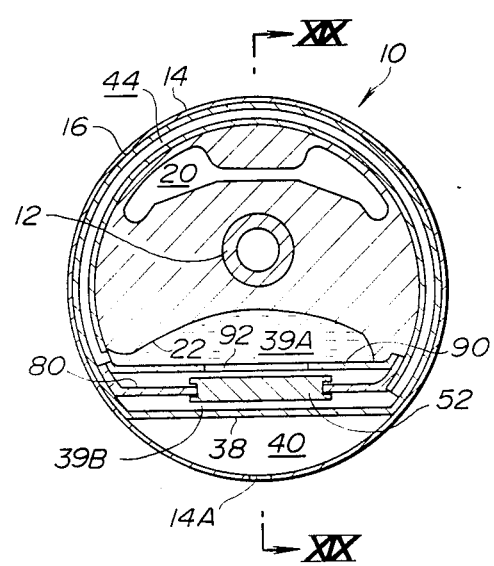

VIBRATION INSULATING DEVICE

BACKGROUND OF THE INVENTION

1. Field of the Invention

This invention relates in general to a vibration insulating device of the type wherein an elastic support member is interposed between inner and outer cylinders, and more particularly to improvements in such an vibration insulating device to prevent damage of the elastic support member due to tensile force applied thereto.

2. Description of the Prior Art

Vibration insulating devices of the type wherein an elastic (elastomeric) support member is interposed between inner and outer cylinders have been used as engine mounts, cab mounts, bushings or the likes. Such a vibration insulating device is disclosed, for example, in Japanese Patent Provisional Publication No. 61-65935, in which the elastic support member is formed with two liquid chambers which are located on the opposite sides of the inner cylinder. The two liquid chambers communicate with each other through a restriction passage. With this arrangement, vibration applied between the inner and outer cylinders causes expansion and contraction of each fluid chamber, so that liquid moves between the two liquid chambers through the restriction passage. In this process, vibration is damped by flow resistance of fluid which flows from one liquid chamber through the restriction passage to the other liquid chamber.

However, difficulties have encountered in such a vibration insulating device upon being set in a usable position in which a load of a supported body is applied to the elastic support member. When the load of the support body is applied to the elastic support member, a larger tensile force acts on the side walls defining the liquid chamber located upward of the inner cylinder. This larger tensile force will cause the elastic support member to be cracked, thereby deteriorating durability of the vibration insulating device.

SUMMARY OF THE INVENTION

It is an object of the present invention to provide an improved vibration insulating device which is high in durability and in vibration damping ability.

Another object of the present invention is to provide an improved vibration insulating device in which no considerable tensile force is applied to an elastic support member interposed between inner and outer cylinders so as to prevent generation of crack in the elastic support member.

The vibration insulating device of the present invention is comprised of an elastic support member tightly interposed between inner and outer cylinders. The elastic support member is formed with a hollow whose at least major part is located on one side of a plane containing the axis of the inner cylinder. First and second liquid chambers are formed between a part of the elastic support member and the inner periphery of the outer cylinder. The first and second liquid chambers communicate with each other through a restriction passage for providing flow resistance to the liquid flowing therethrough. Additionally, an air chamber is formed adjacent to one of the first and second liquid chambers through a flexible partition wall.

With this arrangement, by virtue of the hollow formed in the elastic support member, the elastic support member is prevented from receiving tensile force. Accordingly, the elastic support member is protected from cracking thereby to improve the durability of the elastic support member. Furthermore, a greater vibration damping effect can be obtained by liquid displacement between two liquid chambers through the restriction passage during application of vibration between the inner and outer cylinders.

BRIEF DESCRIPTION OF THE DRAWINGS

In the drawings, like reference numerals designate corresponding elements and parts throughout all the figures, in which:

FIG. 17 is a vertical sectional view of a fifth embodiment of the vibration insulating device in accordance with the present invention, taken in the direction of arrows substantially along the line XVII—XVII of FIG. 18;

FIG. 18 is a vertical sectional view taken in the direction substantially along the line XVIII—XVIII of FIG. 17;

FIG. 19 is a vertical sectional view of a sixth embodiment of the vibration insulating device in accordance with the present invention, taken in the direction of arrows substantially along the line XIX—XIX of FIG. 20;

FIG. 20 is a vertical sectional view taken in the direction of arrows substantially along the line XX—XX of FIG. 19;

DETAILED DESCRIPTION OF THE INVENTION

Figure 1:
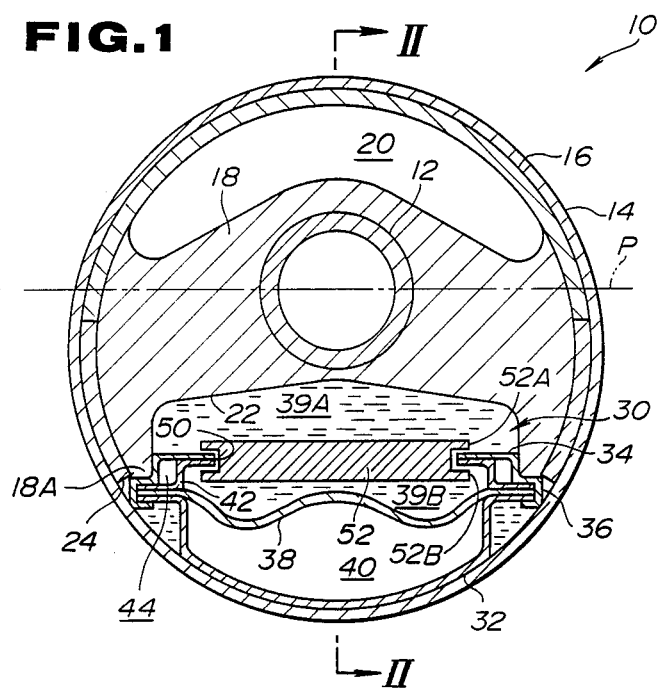
FIG. 1 is a vertical sectional view of a first embodiment of a vibration insulating device in accordance with the present invention, which is taken in the direction of arrows substantially along the line I—I of FIG. 2.

Referring now to FIGS. 1 to 8, there is shown a first embodiment of a vibration insulating device 10 in accordance with the present invention. In this embodiment, the vibration insulating device 10 is used for an automotive vehicle and comprise inner and outer cylinders 12, 14 which are connected respectively to an internal combustion engine and a vehicle body though not shown. The inner and outer cylinders 12, 14 may be connected respectively to the vehicle body and the engine. An intermediate cylinder 16 is fitted on the inner periphery of the outer cylinder 14. The inner, outer and intermediate cylinders 12, 14, 16 are formed of steel.

An elastic support member 18 is tightly interposed between the inner and outer cylinders 12, 14 and formed of elastomeric material such as rubber. The elastic support member 18 is bonded to the inner peripheral surface of the intermediate plate 16 by means of vulcanization adhesion. The elastic support member 18 is formed with a hollow 20 which is located on an upper side (in FIGS. 1 to 4) of an imaginary horizontal plane P. It is to be noted that load of the engine is applied perpendicularly to the horizontal plane P through the inner cylinder 12, to that inner cylinder 12 displaces downward upon receiving the load of the engine. Accordingly, by virtue of the hollow 20 formed upward of the inner cylinder 12, no tensile force is applied to the elastic support member 18 even if the inner cylinder 12 displaces downward.

The elastic support member 18 is formed with a cutout or another hollow 22 which is located on a lower side of the horizontal plane P. In other words, the hollow 20 and the cutout 22 are located opposite with each other with respect to the horizontal plane P. The cutout 22 is filled with liquid such as water or oil. In this connection, the intermediate cylinder 16 is formed at a part thereof with a cutout 24 so that a part of the inner periphery of the outer cylinder 14 is exposed to the cutout 22 of the elastic support member 18. A pair of O-rings 26 are fitted on the outer peripheral surface of the intermediate cylinder 16 and located respectively on the opposite sides of the cutout 22. The O-rings 26, 26 are also fitted on the inner peripheral surface of the outer cylinder 14 in such a manner as to be coaxial with the intermediate cylinder 16, thereby maintaining liquid-tight seal for the elastic support member cutout 22.

Figure 3:
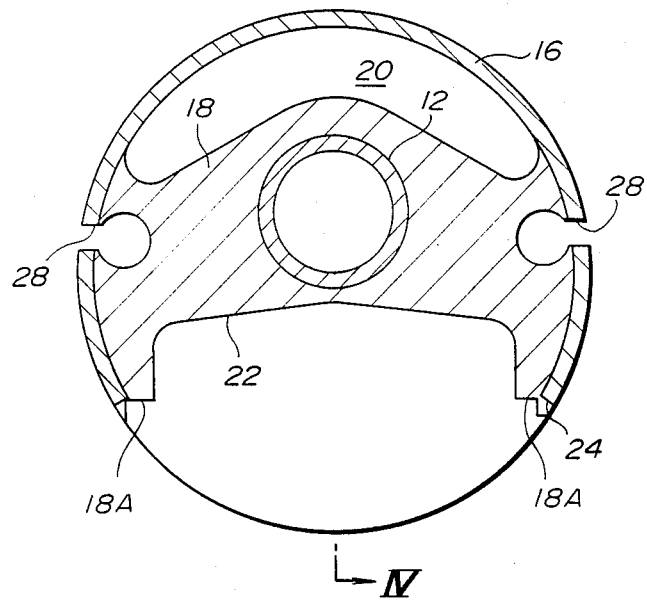
FIG. 3 is a vertical sectional view showing the state of inner and outer cylinders and an elastic support member used in the vibration insulating device of FIG. 1, before assembly of the vibration insulating device.
Figure 4:
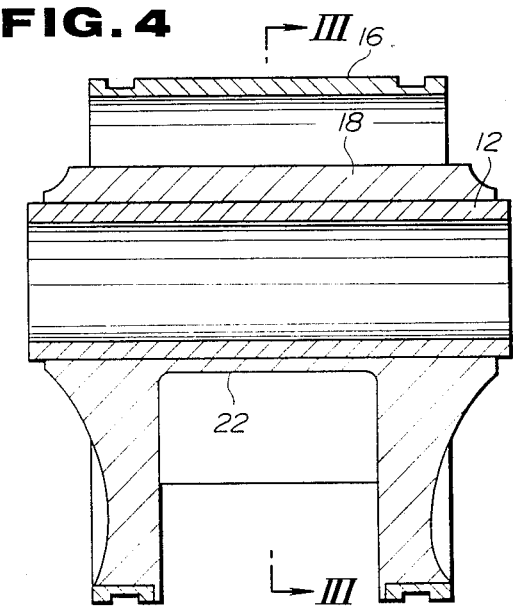
FIG. 4 is a vertical sectional view taken in the direction of arrows substantially along the line IV—IV of FIG. 3.

As shown in FIG. 3, the intermediate cylinder 16 consists of two segments which are separate at their parting portions 28 and separate from each other in a state where the intermediate cylinder segments are bonded onto the outer surface of the elastic support member 18. It is to be understood that the separate segments of the intermediate cylinder 16 are brought into tight contact with each other at their parting portions 28 as shown in FIG. 1 upon being fitted inside the outer cylinder 14 and upon the outer cylinder 14 being squeezed to slightly reduce the outer diameter of the outer cylinder 14. It will be appreciated that the intermediate cylinder 16 may be of one-piece type without the parting portions 28.

Figure 5:
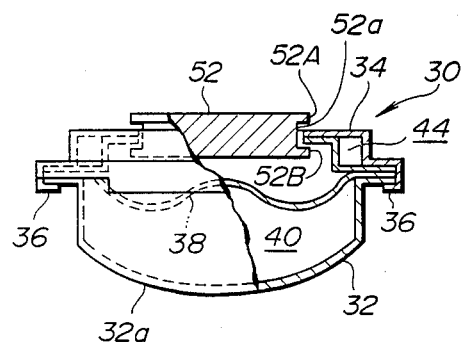
FIG. 5 is a side view partly in section of a vibration damping unit used in the vibration damping unit used in the vibration insulating device of FIG. 1.
Figure 6:
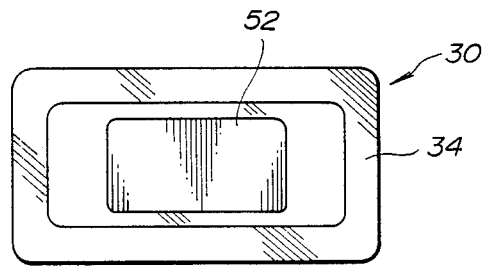
FIG. 6 is a plan view of the vibration damping unit of FIG. 5.
Figure 7:
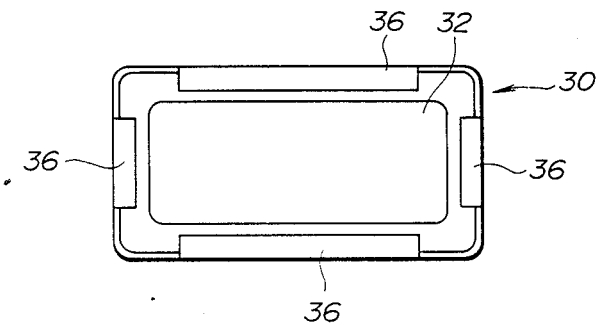
FIG. 7 is a bottom view of the vibration damping unit of FIG. 5.
Figure 8:
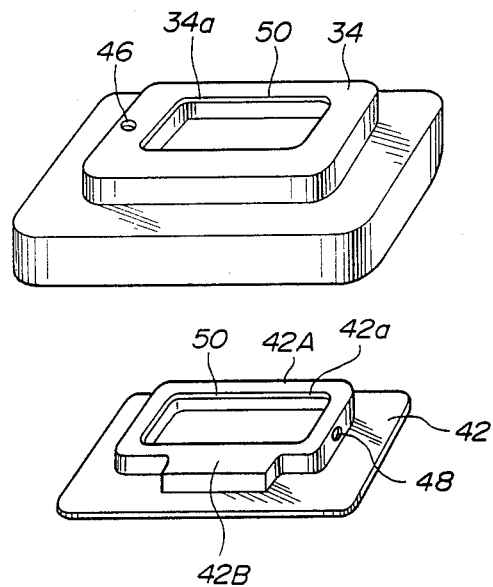
FIG. 8 is an exploded perspective view of an upper cover and an intermediate plate of the vibration damping unit of FIG. 5.

A vibration damping unit 30 as shown in FIGS. 5 to 7 is fixedly disposed within the cutout 22. The vibration damping unit 30 includes upper and lower covers 32, 34 which are fixedly connected with each other to be formed box-shaped. More specifically, the lower cover 32 is of the deep dish shape and opened at its upper end, while the upper cover 34 is the shallow dish shape and opened at its lower end. The lower end section of the upper cover 34 is caulked on the upper section of the lower cover 32 to form a caulked section 36, thereby to maintain liquid-tight seal between the lower and upper covers 32, 34. A diaphragm 38 formed of elastomeric material such as rubber is fixedly secured between the lower and upper cover 32, 34 in such a manner that the peripheral section of the diaphragm 38 is fixedly put between the upper end section of the lower cover 32 and the lower end section of the upper cover 34 at the caulked section 36. Thus, a confined air chamber 40 filled with air is formed between the diaphragm 38 and lower cover 32, maintaining gas-tight seal.

Figure 2:
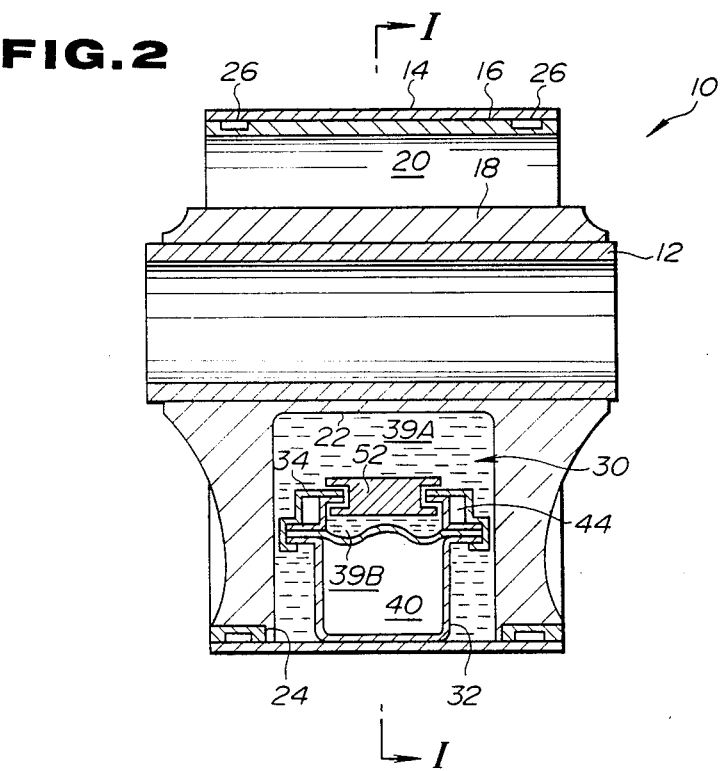
FIG. 2 is a vertical sectional view of the vibration insulating device taken in the direction of arrows substantially along the line II—II of FIG. 1.

As shown in FIGS. 1 and 2, a space of the cutout 22 other than the vibration damping unit 30 serves as a small liquid chamber 39A, while the a space between the upper cover 34 and the diaphragm 38 serves as another small liquid chamber 39B. An intermediate plate 42 is fixedly disposed between the diaphragm 38 and the upper cover 34. More specifically, the peripheral section of the intermediate plate 42 is fixedly put between the peripheral sections of the diaphragm 38 and the upper cover 34 at the caulked section 36. The intermediate plate 42 is formed at its central part with a protruding section 42A having a L-shaped cross-section as shown in FIGS. 1 and 2. The protruding section 42A is continuous to be endless and defines a central opening 42a. The protruding section 42A is in tight contact with the inner surface of the upper cover to form an orifice passage 44 therebetween. The protruding section 42A is integrally formed with an outwardly projected portion 42B which sealingly contacts with the back-side surface of the upper cover 34 thereby to form the orifice passage 44 into the generally C-shape as viewed in the vertical direction as viewed in the vertical direction in FIGS. 1 and 2 and serves as an orifice to restrict the flow of liquid flowing therethrough. The orifice passage 44 communicates with the small liquid chamber 39A through an opening 46 formed in the upper cover 34 and with the small liquid chamber 39B through an opening 48 formed in the intermediate plate 42. Thus, the small fluid chambers 34A, 39B are in communication with each other through the orifice passage 44.

The upper cover 34 is formed with a central opening 34a which coincides with the central opening 42a of the intermediate plate 42, so that a through-opening 50 is formed upon the upper cover 34 and the intermediate plate 42 being fixedly secured with each other to be in tight contact with each other. A vibration plate 52 is movably secured to the inner peripheries of the upper cover 34 and the intermediate plate 42 defining the through-opening 50 in such a manner that the through-opening 50 is closable with the vibration plate 52. The vibration plate 52 is formed at upper and lower ends with upper and lower flanges 52A, 52B which form therebetween a groove 52a. It is to be noted that the distance (or width of the groove) between the flanges 52A, 52B is larger than the total of the thicknesses of the upper cover 34 and the intermediate plate 42, so that the vibration plate 52 is slightly movable vertically in FIGS. 1, 2 and 5. Additionally, it is to be noted that the dimension of a space between the peripheral surface of the groove 52a of the vibration plate 52 and the inner periphery of the through-opening 50 in the upper cover 34 and the intermediate plate 42 is such that substantially no liquid flows through the space.

In order to assemble the vibration insulating device 10, first the elastic support member 18 is set between the inner cylinder 12 and the intermediate cylinder 16 and bonded to them by the vulcanization adhesion. Then, the intermediate cylinder 12 is fitted on the outer peripheral surface with the O-rings 26, and it together with the elastic support member 18 and the inner cylinder 12 is dipped in liquid in which the intermediate cylinder 12 is fitted inside the outer cylinder 14, installing the vibration damping unit 30 in position within the cutout 22 of the elastic support member 18. Thereafter, the outer cylinder 14 is squeezed to slightly reduce the outer diameter thereof, thus completing assembly of the vibration insulating device 10.

In this case, the curvature of the bottom surface 32a of the lower cover 32 is equal to that of the inner peripheral surface of the outer cylinder 14 in an imaginary vertical plane (not shown) to which the axis of the outer cylinder 14 is perpendicular, so that the lower cover 32 is in tight contact with the outer cylider 14. Additionally, the opposite ends of the upper cover 34 in the longitudinal direction are pressed down by two pressing sections 18A, 18A located opposite relative to an imaginary vertical plane (not shown) containing the axis of the inner cylinder 12, thereby biasing the lower cover 32 against the inner peripheral surface of the outer cylinder 14. Thus, the vibration damping unit 30 is fixedly secured in position. It will be understood that the vibration damping unit 30 may be movably disposed within the cutout 22 of the elastic support member 18.

In order to put this vibration insulating device 10 into practical use, the outer cylinder 14 is installed or connected to the automotive vehicle body while the automotive vehicle engine is supported to the inner cylinder 12. In this case, the load of the engine is applied downward or perpendicularly to the imaginary horizontal plane P in FIG. 1. Accordingly, even when the load and vibration of the engine acts on the vibration insulating device 10, only compressive force in the downward or lateral directions is applied to the elastic support member 18 in FIG. 1. As described above, no tensile force is applied to the elastic support member 18 by virtue of the hollow 20 which is located above the inner cylinder 12. In other words, no part to which tensile force acts exists in the support elastic member 18.

During engine vibration, when relatively low frequency vibrations are applied through the inner cylinder 12 to the vibration insulating device 10, the small liquid cylinder 39A receives compressive force upon elastic deformation of the elastic support member 18. This compressive force raises the fluid pressure within the small liquid chamber 39B which liquid pressure is transmitted through the orifice passage 44 to the small liquid chamber 39B, so that the liquid pressure within the small liquid chamber 39B causes the diaphragm 38 to elastically deform. This absorbs or damps relatively low frequency engine vibrations.

When relatively high frequency vibrations are applied through the inner cylinder 12 to the vibration insulating device 10, the orifice passage 44 is brought into a blocked or stuck condition. In this case, the vibration plate 52 moves vertically or vibrates to make a slight movement relative to the upper cover 34 of the vibration damping unit 30. This suppresses pressure rise within the small liquid chamber 39A, thereby preventing an increase in dynamic spring constant of the vibration insulating device 10.

Figure 9:
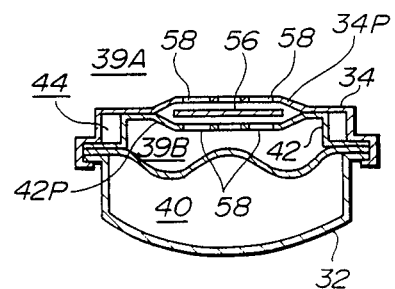
FIG. 9 is a vertical sectional view of a vibration damping unit used in a second embodiment of the vibration insulating device in accordance with the present invention.

FIG. 9 illustrates an essential part of a second embodiment of the vibration insulating device in accordance with the present invention, which is similar to the first embodiment except for the construction of the vibration damping unit 30. In this embodiment, the upper cover 34 and the intermediate plate 42 of the vibration damping unit 30 have respectively central plate portions 34P, 42P which are slightly separate from each other to define therebetween a space in which a vibration plate 56 is movably disposed. Each of the central plate portions 34P, 42P is formed with a plurality of through-holes 58 so that fluid pressure within the small liquid chambers 39A, 39B are transmitted to the vibration plate 56.

With this arrangement, during vibration of relatively low frequencies, the vibration plate 56 is brought into tight contanct with the central plate portions 34P, 42P thereby substantially close the through-holes 58. Accordingly, liquid passes through the orifice passage 44 generating flow resistance of the liquid. When vibration is of high frequencies so that the orifice passage 44 is brought into blocked or stuck condition, the vibration plate 56 vibrates to suppress pressure rise in the small liquid chamber 39A. Additionally, in this embodiment, since the vibration plate 56 is covered with the upper cover central plate portion 34B, vibration of the vibration plate 56 cannot be prevented even in case the elastic support member 18 (as shown in FIG. 1) is brought into contact with the upper cover 34 of the vibration damping unit 30 upon vibration stroke becoming larger.

Figure 10:
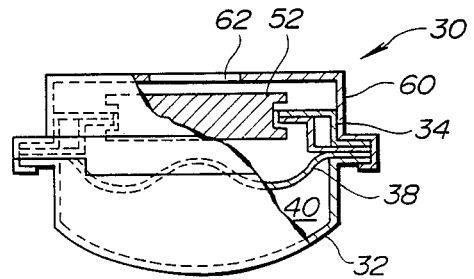
FIG. 10 is a side view partly in section of a vibration damping unit used in a third embodiment of the vibration insulating device in accordance with the present invention.
Figure 11:
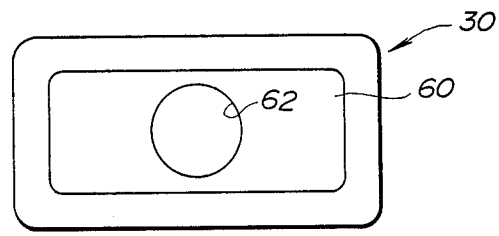
FIG. 11 is a plan view of the vibration damping unit of FIG. 10.
Figure 12:
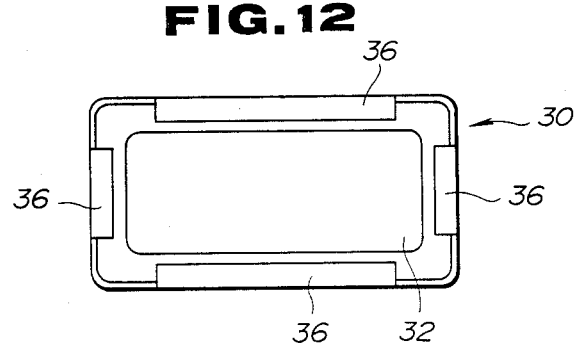
FIG. 12 is a bottom view of the vibration damping unit of FIG. 10.
Figure 13:
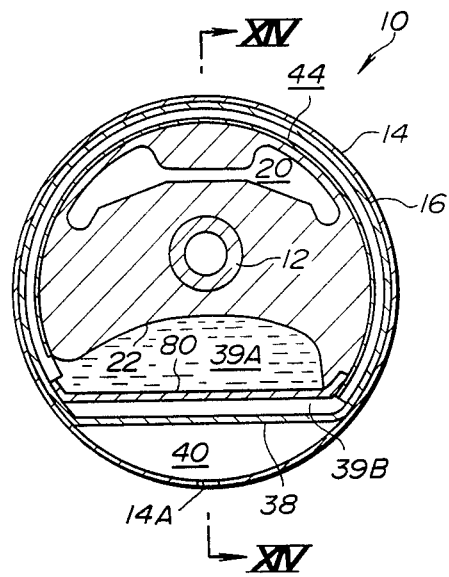
FIG. 13 is a vertical sectional view of a fourth embodiment of the vibration insulating device in accordance with the present invention.

FIGS. 10 to 12 illustrate an essential part of a third embodiment of the vibration insulating device 10 in accordance with the present invention, similar to the first embodiment except for the construction of the vibration damping unit 30. In the vibration damping unit 30 of this embodiment, a protective cover 60 is fixedly disposed over the upper cover 34. The central portion of this protection cover 60 is separate from the vibration plate 52 and formed with a central opening 62 through which liquid pressure within the small liquid chamber 39A is applied to the vibration plate 52.

With the vibration insulating device 10 provided with the thus arranged vibration damping unit 30, the same effects as in the first embodiment can be obtained. Additionally, vibration of the vibration plate 52 is not prevented by the elastic support member 18 even in case the elastic support member 18 is brought into contact with the protection cover 60 upon an increase in displacement of the elastic support member 18.

FIGS. 13 to 16 illustrate a fourth embodiment of the vibration insulating device 10 according to the present invention, similar to the first embodiment. In this embodiment, a partition plate 80 is fixedly interposed between the elastic support member 18 and the outer cylinder 14 in such a manner that a major part of the partition plate 80 is located in the cutout 22 of the elastic support member 18. The small liquid chamber 39A is formed between the wall surface of the cutout 22 and the partition plate 80. Additionally, a generally cylindrical elastic (elastomeric) diaphragm 82 is disposed on the outer peripheral surface of the intermediate cylinder 16. A part of the elastic diaphragm 82 serves as the diaphragm bent toward the axis of the cylindrical diaphragm 82. The small liquid chamber 39B is formed between the diaphragm 38 and the partition plate 80.

Figure 14:
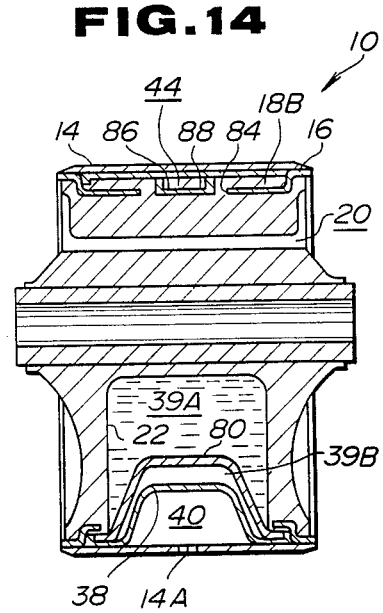
FIG. 14 is a vertical sectional view taken in the direction of arrows substantially along the line XIV—XIV of FIG. 13.
Figure 15:
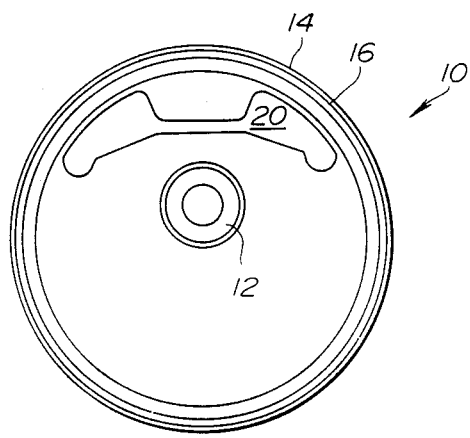
FIG. 15 is a side view of the vibration insulating device of FIG. 13.
Figure 16:
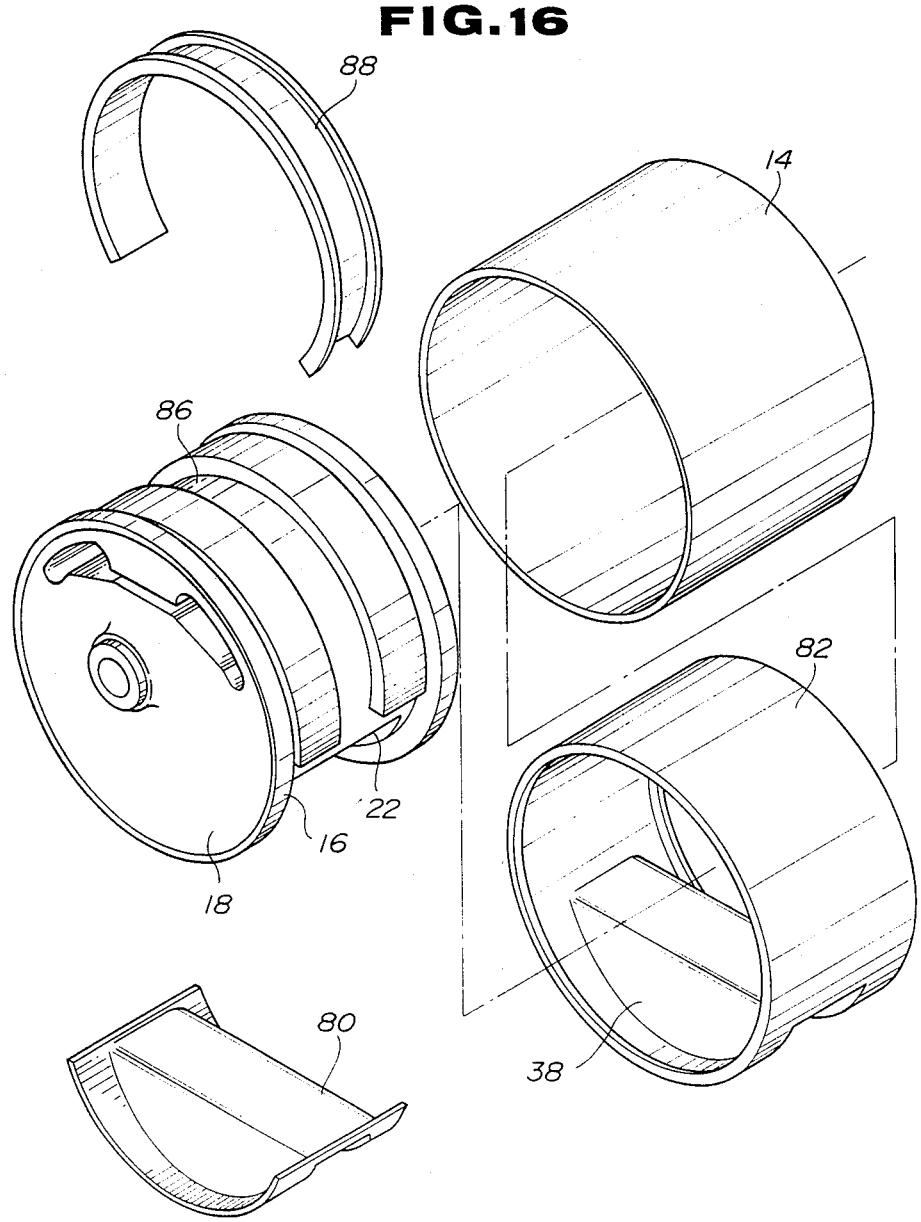
FIG. 16 is an exploded perspective view of the vibration insulating device of FIG. 13.

In this embodiment, as best shown in FIG. 14, the intermediate cylinder 16 consists of two parts defining therebetween a cutout 84. A part of the elastic support member 18 extends outwardly to reach the outside of the intermediate plate 16 thereby to form a thin extension section 18B. This third extension section 16B is formed at its outer periphery with an arcuate cutout 86 in which an arcuate orifice guide 88 is fitted. The orifice guide 88 is generally C-shaped and formed at its outer surface with a groove throughout its length. The orifice guide 88 is in contact with the inner periphery of the cylindrical elastic diaghragm 82 thereby to form the orifice passage 44. The orifice passage 44 is communicated at its one end with the small liquid chamber 39A and the other end thereof with the small liquid chamber 39B.

Accordingly, the small liquid chambers 39A, 39B communicate with each other through the orifice passage 44 having a length of about one turn along the inner periphery of the outer cylinder 14, thereby obtaining larger damping of vibration. In this embodiment, the air chamber 40 is formed between the diaphragm 38 and the outer cylinder 14 and communicates with ambient air through a through-hole 14A formed in the outer cylinder 14.

FIGS. 17 and 18 llustrated a fifth embodiment of the vibration insulating device 10 according to the present invention, similar to the fourth embodiment with the exception that the same vibration plate 52 as in the first embodiment is arranged at the central portion of the partition plate 80. With this embodiment, the vibration plate 52 can vibrate when high frequency vibrations are applied to the vibration insulating device 10.

FIGS. 19 and 20 illustrate a sixth embodiment of the vibration insulating device 10 according to the present invention, similar to the fifth embodiment with the exception that a protection cover 90 is fixedly disposed over the partition plate 80 provided with the vibration plate 52. The protection cover 90 is formed at its central portion with a through-opening 92 through which liquid pressure within the small liquid chamber 39A is applied to the vibration plate 52. In this embodiment, the elastic support member 18 is prevented from striking against the vibration plate 52 even during vibration of large amplitudes.

Figure 21:
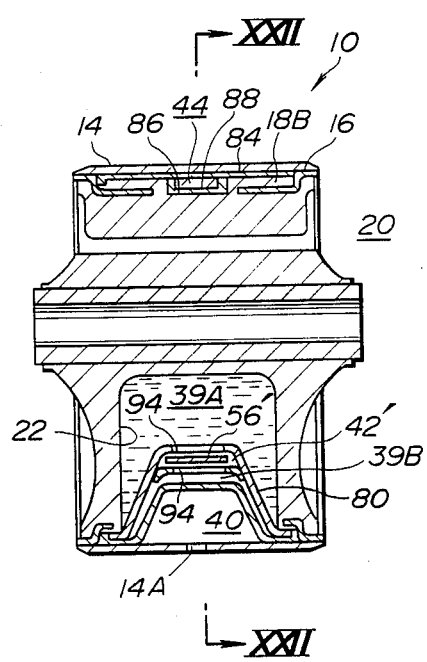
FIG. 21 is a vertical sectional view of a seventh embodiment of the vibration insulating device in accordance with the present invention, taken in the direction of arrows substantially along the line XXI—XXI of FIG. 22.
Figure 22:
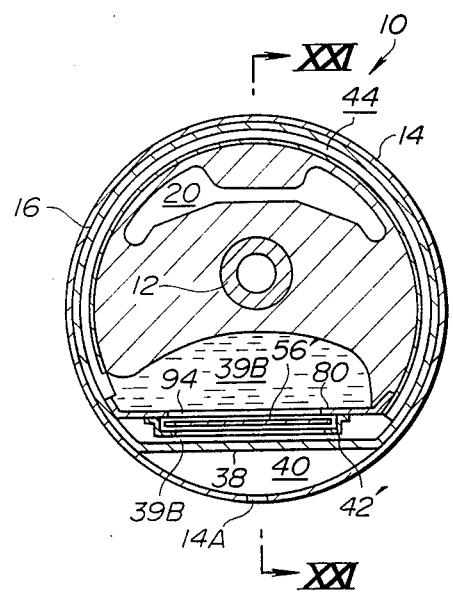
FIG. 22 is a vertical sectional view taken in the direction of arrows substantially along the line XXII—XXII of FIG. 21.

FIGS. 21 and 22 illustrate a seventh embodiment of the vibration insulating device 10 according to the present invention, similar to the fourth embodiment. In this embodiment, an intermediate plate 42 is fixedlly attached to the partition plate 80 and located between the diaphragm 38 and the the partition plate 80. A space in which a vibration plate 56' is movably disposed is formed between the central portion of the partition plate 80 and the intermediate plate 42. The central portion of the partition plate 80 and the intermediate plate 42' are respectively formed with through-openings 94, 94, so that the small liquid chambers 39A, 39B are communicable with each other through the through-openings 94, 94. Also in this embodiment, high frequency vibrations can be damped upon vibration of the vibration plate 56'.

Figure 23:
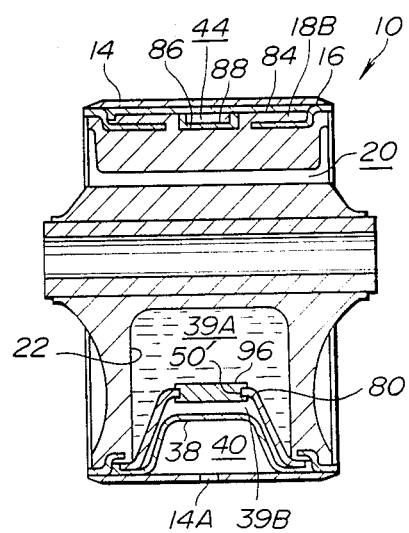
FIG. 23 is a vertical sectional view of an eighth embodiment of the vibration insulating device in accordance with the present invention.

FIG. 23 illustrates an eighth embodiment of the vibration insulating device 10 in accordance with the present invention, similar to the fifth embodiment. In this embodiment, the through-opening 50' of the partition plate 80 is securely covered with an elastic plate 96 formed of elastomeric material such as rubber. More specifically, the peripheral section of the the elastic plate 96 is bonded to the periphery of the through-hole 50 by means of vulcanization adhesion. This elastic plate 96 can vibrate during application of high frequency vibrations, thus providing the same effect as with the vibration plate 52, 56, 56' in the other embodiments.

Figure 24:
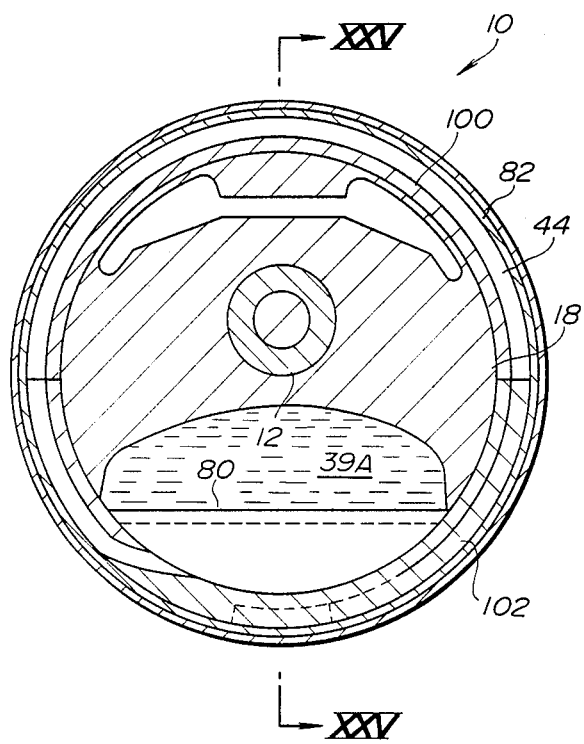
FIG. 24 is a vertical sectional view of a ninth embodiment of the vibration insulating device in accordance with the present invention, taken in the direction of arrows substantially along the line XXIV—XXIV of FIG. 25.
Figure 25:
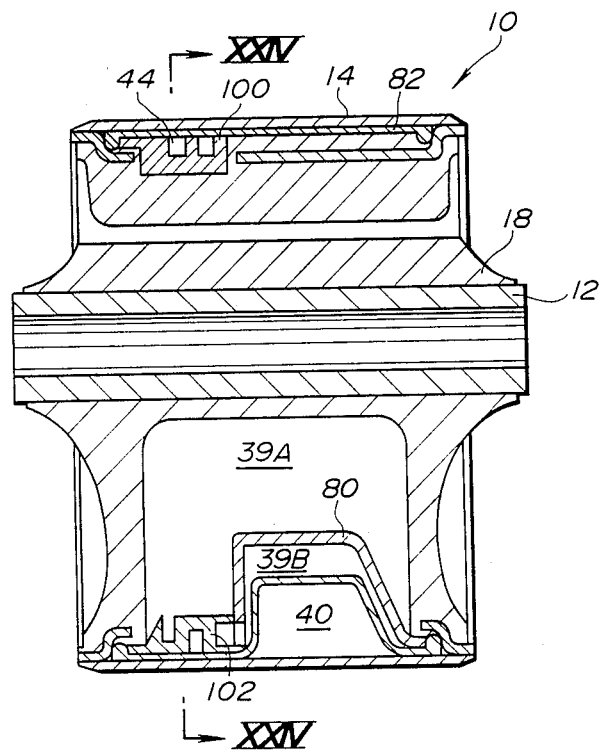
FIG. 25 is a vertical sectional view taken in the direction substantially along the line XXV—XXV of FIG. 24.

FIGS. 24 and 25 illustrate a ninth embodiment of the vibration insulating device 10 in accordance with the present invention, which is similar to the fourth embodiment with the orifice guide 88 of the fourth embodiment is replaced with an annular or cylindrical orifice guide 104. The orifice guide 104 consists of a pair of semicylindrical orifice guide counterparts 100, 102 which are in tight contact with the inner peripheral surface of the elastic diaphragm 82 in the same manner as in the fourth embodiment. The opposite ends of the orifice guide counterpart 100 are in contact with those of the orifice guide counterpart 102 thereby to form the annular or cylindrical orifice guide 104. The orifice guide 104 is formed with a long spiral goove making a plurality of turns around the inner cylinder 12, so that the longer orifice passage 44 is formed along the inner periphery of the elastic diaphragm 82. The orifice passage 44 is communicated at its one end with the small liquid chamber 39A and at the other end thereof with the small liquid chamber 39B.

With this embodiment, the orifice passage 44 makes a plurality of turns around the inner cylinder 12 to obtain a desirable length while changing the cross-sectional area of the orifice passage 44, thereby enabling to damp vibrations throughout a wide range of frequencies. It will be understood that the vibration plate 52, 56, 56' in the above-discussed embodiments may be provided to suppress an increase in dynamic spring constant of the vibration insulating device 10 during vibration at high frequencies.

What is claimed is:

1. A vibration insulating device comprising:
an inner cylinder;
an outer cylinder disposed surrounding said inner cylinder;
an elastic support member tightly interposed between said inner and outer cylinders;
means defining a hollow in said elastic support member, at least major part of said hollow being located on one side of a plane containing axis of said inner cylinder;

means defining first and second liquid chambers between a part of said elastic support member on the other side of said plane and inner periphery of said outer cylinder;

means defining a restriction passage through which said first and second liquid chambers are in communication with each other to be restricted in flow of liquid; and means defining an air chamber filled with air, said air chamber being adjacent to one of said first and second chambers through a flexible partition wall.

2. A vibration insulating device as claimed in claim 1, wherein a main load is applied perpendicular to said plane.

3. A vibration insulating device as claimed in claim 2, wherein said main load is applied to said inner cylinder, wherein said one side is located over said the other side with respect to the direction of application of said main load.

4. A vibration insulating device as claimed in claim 1, wherein said hollow extends along the periphery of said outer cylinder, the inner periphery of said outer cylinder being separate through said hollow from a major part of said elastic support member between said inner and outer cylinders.

5. A vibration insulating device as claimed in claim 1, wherein said elastic support member is formed with a cutout located on said the other side of said plane, said first and second liquid chambers are defined between inner wall surface of said cutout and the peripheral surface of said outer cylinder.

6. A vibration insulating device as claimed in claim 1, wherein said first and second liquid chambers defining means includes separation wall means defining said first and second liquid chambers on opposite sides thereof.

7. A vibration insulating device as claimed in claim 6, further comprising a vibration plate movably installed to said separation wall means.

8. A vibration insulating device as claimed in claim 7, further comprising protecting means for protecting said vibration plate from contacting with a part of said elastic support member.

9. A vibration insulating device as claimed in claim 1, wherein said restriction passage defining means includes means defining said restriction passage in said separation wall means, said restriction passage having a first end communicating with said first liquid chamber and a second end communicating with said second liquid chamber.

10. A vibration insulating device as claimed in claim 1, wherein said restriction passage defining means includes means defining said restriction passage along the inner periphery of said outer cylinder, said restriction passage being formed around said inner cylinder and having a first end communicating with said first liquid chamber and a second end communicating with said second liquid chamber.

11. A vibration insulating device as claimed in claim 10, wherein said restriction passage has a length of at least one turn around said inner cylinder.

12. A vibration insulating device as claimed in claim 1, further comprising liquid filled in said first and second liquid chambers and in said restriction passage.

13. A vibration insulatingt device as claimed in claim 1, wherein said inner cylinder is connected to one of a vibratory body and a vibration recieving body, and said outer cylinder is connected to the other of said vibratory and vibration recieving bodies.

14. A vibration insulating device as claimed in claim 1, wherein said inner cylinder is connected to an engine to receive load of the engine, and said outer cylinder is connected to a vehicle body.

15. A vibration insulating device as claimed in claim 14, wherein said one side of said plane is located upward relative to a direction to which said load of the engine is applied through said inner cylinder.

16. A vibration insulating device for an automotive vehicle, comprising:

an inner cylinder connected to an engine in such a manner that load of the engine is applied thereto;

an outer cylinder connected to a vehicle body and disposed surrounding said inner cylinder;

an elastic support member tightly interposed between said inner and outer cylinders;

means defining a hollow in said elastic support member, at least a major part of said hollow being located on an upper side of a horizontal plane containing axis of said inner cylinder;

means defining first and second liquid chambers between a part of said elastic support member on a lower side of said horizontal plane and inner periphery of said outer cylinder, said lower part being located lower than said upper part with respect to a direction of application of said load of the engine through said inner cylinder;

means defining a restriction passage through which said first and second liquid chambers are in communication with each other to be restricted in flow of liquid; and means defining an air chamber filled with air, said air chamber being adjacent to one of said first and second chambers through a flexible partition wall.

17. A vibration insulating device as claimed in claim 14, wherein said hollow extends axially and along the inner periphery of said outer cylinder, said hollow being generally symmetrical with respect to a vertical which is perpendicular to said horizontal plane and containing the axis of said inner cylinder.

* * * * *